Patented Feb. 20, 1934

1,948,116

UNITED STATES PATENT OFFICE 1,948,116

DYESTUFF AND DYESTUFF INTERMEDIATE

David Clarence Rhys Jones and Robert Fraser Thomson, Grangemouth, Scotland, assignors to Imperial Chemical Industries Limited, a corporation of Great Britain No Drawing. Application June 6, 1932, Serial No. 615,761, and in Great Britain June 16, 1931

14 Claims. (Cl. 260—61)

This invention relates to the production of dyestuffs and intermediates of the benzanthrone series. It relates especially to a process for the preparation of benzanthrone derivatives by the separation of the alkali-soluble products obtained in the condensation of o-halogenated benzoic acids with benzanthrones.

We have found that the alkali-soluble products obtained in the treatment of o-halogenated benzoic acids and benzanthrones with alkaline condensing agents for example, the products obtained according to the process of British Patent No. 358,426, are mixtures which can be separated into substances useful as dyestuffs or intermediates by fractional solution, crystallization or precipitation from solvents such as glacial acetic acid or benzene. Thus the alkali-soluble product obtained by condensing o-chlorobenzoic acid with benzanthrone can be extracted with glacial acetic acid leaving an insoluble violet residue. Further, if the glacial acetic acid used in the extraction is allowed to cool and the cooled solution diluted with water, a green body is precipitated which appears to consist wholly or in part of benzanthronyl-benzoic acid. If this green body is filtered off, and the aqueous filtrates so obtained are evaporated, a yellow body is obtained. We have also found that the separated fractions may be treated with halogenating agents to yield further products useful as dyestuffs or intermediates. The green body and the green products of corresponding constitution (obtained, for instance, by brominating the green body) yield on treatment with condensing agents vat dyes which are apparently dibenzpyrenequinones.

The invention, therefore, consists of a process for the manufacture of benzanthrone derivatives which comprises the separation into two or more fractions of the alkali-soluble products obtainable by condensation of o-halogenated benzoic acids and benzanthrone, by extracting with a suitable inert organic solvent the portion readily soluble in glacial acetic acid, filtering and removing the second fraction from the filtrate by addition of an inert liquid which is miscible therewith and in which the second fraction is substantially insoluble, again filtering and finally recovering the residual dissolved matter from the filtrate.

The invention also comprises the halogenation of one or more of the fractions so obtained and the treatment of the products either before or after halogenation with condensing agents.

The invention is illustrated but not limited by the following examples, in which the parts are by weight.

Example 1

A starting material for separation is prepared as follows:

90 parts of sodium o-chlorobenzoate, 115 parts of benzanthrone and 28 parts of caustic potash are intimately mixed and heated with stirring to about 180–200° C. for two hours. The mixture is allowed to cool, ground up, extracted with water and filtered. The filtrate is acidified and the resulting precipitate filtered off, washed and dried.

42 parts of this alkali-soluble product are boiled with 750 parts of glacial acetic acid for 30 minutes. The mixture is then cooled to 40° C. and filtered to separate a deep violet insoluble residue. This dyes cotton in blue shades from a deep red-violet vat.

The filtrates are then diluted with 150 parts of water, and the light green precipitate filtered, washed and dried. This green substance dissolves in alkalies giving orange-yellow solutions possessing an intense green fluorescence, and appears to consist wholly or in part of benzanthronylbenzoic acid of the probable formula

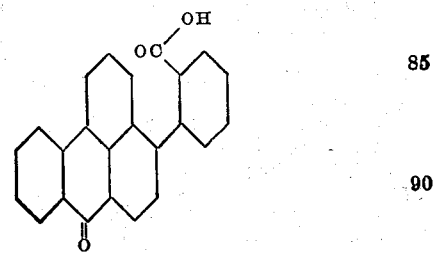

A further yellow substance may be isolated by evaporating down the aqueous filtrates.

The first extraction may be effected with benzene instead of glacial acetic acid, and in this case the green fraction is precipitated from the filtrates by dilution with petroleum ether or petrol.

Example 2

This describes bromination of the green precipitate obtained according to Example 1.

To 21 parts of this green precipitate, dissolved in 700 parts of glacial acetic acid, are added 10 parts of bromine. The mixture is stirred at room temperature for 10 minutes, after which it is diluted with 1500 parts of water. The green precipitate which is obtained by dilution is filtered, washed and dried. It dissolves in alkali giving a yellow-orange solution with an intense fluorescence, and appears to consist wholly or in part of bromo-benzanthronylbenzoic acid.

Example 3

This describes the treatment of the brominated product obtained according to Example 2, with a condensing agent.

3 parts of the brominated product are mixed with 3 parts of boric acid and 10 parts of concentrated sulphuric acid, and the mixture is heated first at 100° C. for 30 minutes and then at 150° C. for 30 minutes. After heating, the solution is cooled and poured onto ice, and the product filtered, and the residue washed and stirred with dilute alkali for 10 minutes. The mixture is then filtered, washed and dried when it gives a brown powder dissolving to a red-violet solution in sulphuric acid and dyeing cotton in yellow to orange shades from a red alkaline hydrosulphite vat. It appears to be a compound of the dibenzpyrenequinone series.

Example 4

This describes the treatment of the green precipitate, obtained according to Example 1, with a condensing agent.

5 parts of this green precipitate are mixed with 250 parts of nitrobenzene and 5 parts of phosphorus pentoxide, and the mixture is heated at 120° C. for six hours. The solution is then steam-distilled and the residue is boiled with 1% soda solution, filtered, washed and dried. The dry product is a brown powder dissolving to a red-violet solution in sulphuric acid and dyeing cotton in orange-brown shades from a red alkaline hydrosulphite vat, and appears to consist of dibenzpyrenequinone.

Example 5

This is another example of the treatment of the green precipitate of Example 1 with a condensing agent.

3 parts of the green precipitate are mixed with 3 parts of boric acid and 10 parts of concentrated sulphuric acid and the mixture then heated at 150° C. for 45 minutes. After heating the solution is cooled and poured onto ice, filtered, and the precipitate washed with water and dilute alkali. The residue is a brown powder which dyes cotton from an alkaline hydrosulphite vat and appears to be identical with the product of Example 4.

We claim:

1. A process for preparing dyestuffs and dyestuff intermediates, which comprises reacting a mono-benzanthrone with an ortho-halogen-benzoic acid in the presence of an alkaline condensing agent, recovering the alkali-soluble portion of the reaction product, and separating the latter into fractions according to their solubility in hot, glacial or cold, aqueous acetic acid.

2. A process for preparing a benzanthronyl-ortho-benzoic acid, which comprises reacting a mono-benzanthrone with an ortho-halogen-benzoic acid in the presence of an alkaline condensing agent, recovering the alkali-soluble portion of the reaction product, and recovering from the latter the fraction thereof which is soluble in hot, glacial acetic acid, but insoluble in cold, aqueous acetic acid.

3. A process for preparing a benzanthronyl-ortho-benzoic acid, which comprises reacting a mono-benzanthrone with an ortho-halogen-benzoic acid in the presence of an alkaline condensing agent, recovering the alkali-soluble portion of the reaction product, and extracting from the latter by the aid of an organic solvent the portion thereof which is soluble in hot, glacial acetic acid.

4. A process for preparing a benzanthronyl-ortho-benzoic acid, which comprises reacting a mono-benzanthrone with an ortho-halogen-benzoic acid in the presence of an alkaline condensing agent, recovering the alkali-soluble portion of the reaction product, extracting from the latter by the aid of an organic solvent the portion thereof which is soluble in hot, glacial acetic acid, and diluting the extract to precipitate a benzanthronyl-ortho-benzoic acid.

5. A process for preparing a benzanthronyl-ortho-benzoic acid, which comprises reacting a mono-benzanthrone with an ortho-halogen-benzoic acid in the presence of an alkaline condensing agent, recovering the alkali-soluble portion of the reaction product, recovering from the latter the fraction thereof which is soluble in hot, glacial acetic acid, and reacting upon said fraction with halogenating agents.

6. A process for preparing dyestuffs of the dibenzpyrenequinone series, which comprises reacting a mono-benzanthrone with an ortho-halogen benzoic acid in the presence of an alkaline condensing agent, recovering the alkali-soluble portion of the reaction product, separating from the latter a fraction which is soluble in hot, glacial acetic acid, and reacting upon the latter with ring-closing, condensing agents.

7. A process for preparing dyestuffs of the dibenzpyrenequinone series, which comprises reacting a mono-benzanthrone with an ortho-halogen benzoic acid in the presence of an alkaline condensing agent, recovering the alkali-soluble portion of the reaction product, separating from the latter a fraction which is soluble in hot, glacial acetic acid, and reacting upon the latter in succession with halogenating agents and ring-closing, condensing agents.

8. A process for preparing benzanthrone derivatives which comprises separating into fractions by fractional solution the alkali-soluble portion of the product obtainable by condensing o-halogen-benzoic acid with benzanthrone in the presence of alkaline condensing agents.

9. A process for preparing benzanthrone compounds which comprises extracting with an organic solvent the alkali-soluble portion of the product obtainable by condensing o-halogen-benzoic acid with benzanthrone in the presence of alkaline condensing agents, separating the extract from the residual mass, diluting the extract with an inert liquid which is miscible therewith, separating the diluted extract from the precipitate thus formed, and finally evaporating the extract to recover a third residue.

10. A process for preparing dyestuffs and dyestuff intermediates, which comprises reacting a mono-benzanthrone with an ortho-halogen-benzoic acid in the presence of an alkaline condensing agent, recovering the alkali-soluble portion of the reaction product, and separating the latter into at least three components characterized respectively by having in solid form a violet, green, and yellow color.

11. As a new product of manufacture, a deep violet compound which is substantially identical with the product obtainable by reacting a mono-benzanthrone with an ortho-halogen-benzoic acid in the presence of an alkaline condensing agent, recovering the alkali-soluble portion of the reaction product, boiling the latter in hot concentrated acetic acid, and recovering the residue, said compound dyeing cotton from the vat in blue shades.

12. As a new product of manufacture a halogen benzanthronyl-ortho-benzoic acid, the same being a green body, soluble in alkali with a yellow-orange solution having an intense fluorescence.

13. A process for producing a vat dyestuff of the dibenzpyrenequinone series, which comprises ring-closing a halogenated benzanthronyl-ortho-benzoic acid compound.

14. As a new product of manufacture a vat dyestuff of the dibenzpyrenequinone series, being substantially identical with the product obtainable by halogenating benzanthronyl-ortho-benzoic acid, and ring-closing the halogenation product.

DAVID CLARENCE RHYS JONES.
ROBERT FRASER THOMSON.